US010453255B2

(12) United States Patent
Bachrach et al.

(10) Patent No.: US 10,453,255 B2
(45) Date of Patent: Oct. 22, 2019

(54) TECHNIQUES FOR CREATING POP-UP CARDS FROM 3D MODELS (71) Applicant: AUTODESK, INC., San Rafael, CA (US)

(72) Inventors: Johnathan Bachrach, Berkeley, CA (US); Saul Griffith, San Francisco, CA (US)

(73) Assignee: AUTODESK, INC., San Rafael, CA (US)

(*) Notice: Subject to any disclaimer, the term of this patent is extended or adjusted under 35 U.S.C. 154(b) by 601 days.

(21) Appl. No.: 13/740,097

(22) Filed: Jan. 11, 2013

(65) Prior Publication Data
US 2013/0197872 A1 Aug. 1, 2013

Related U.S. Application Data (60) Provisional application No. 61/586,537, filed on Jan. 13, 2012.

(51) Int. Cl.
G06T 19/00 (2011.01)

(52) U.S. Cl.
CPC ........ *G06T 19/00* (2013.01); *G06T 2219/008* (2013.01)

(58) Field of Classification Search
CPC .................................................. G06T 19/00
USPC .............................................. 703/1
See application file for complete search history.

(56) References Cited

U.S. PATENT DOCUMENTS

| 4,349,973 A * | 9/1982 | Penick | G09F 1/06 40/124.08 |
| 5,317,823 A * | 6/1994 | Brunt, II | G09F 1/08 206/308.1 |
| 5,450,680 A * | 9/1995 | Bromberg | G09F 1/08 40/124.08 |
| 5,657,875 A * | 8/1997 | Hirsh, III | B65D 81/368 206/215 |
| 5,758,438 A * | 6/1998 | Crowell | G09F 1/08 283/117 |

(Continued)

OTHER PUBLICATIONS

Glassner, Andrew. "Interactive pop-up card design. 1." Computer Graphics and Applications, IEEE 22.1 (2002): 79-86.*

(Continued)

*Primary Examiner* — Brian S Cook
*Assistant Examiner* — Iftekhar A Khan
(74) *Attorney, Agent, or Firm* — Artegis Law Group, LLP (57) ABSTRACT One embodiment of the invention is a pop-up engine that generates a pop-up card from a sliced 3D graphics model. In operation, a pop-up engine processes a sliced 3D model to identify locations where each slice of the 3D model is to attach to the pop-up card or to other slices of the 3D model. The pop-up engine traverses the boundary of each slice and, at intervals along the boundary, projects a ray toward the upper portion of the card. If the ray intersects a neighboring slice, then the slice attaches to the neighboring slice at that location. If, however, the ray does not intersect a neighboring slice, then the slice attaches to the upper portion of the card at that location. The pop-up engine then modifies the slice to include a hinge portion that connects the slice to either a neighboring slice or the upper portion at that location.

23 Claims, 8 Drawing Sheets

(56) References Cited

U.S. PATENT DOCUMENTS

| | | | | |
|---|---|---|---|---|
| 5,864,973 A * | 2/1999 | Cole | ...................... | A63H 33/38 273/157 R |
| 5,933,989 A * | 8/1999 | Volkert | ...................... | G09F 1/06 40/124.08 |
| 5,943,800 A * | 8/1999 | Rose | ...................... | G09F 1/06 40/124.08 |
| 5,983,538 A * | 11/1999 | Crowell | ...................... | G09F 1/00 40/124.14 |
| 6,173,515 B1 * | 1/2001 | Walsh | ...................... | G09F 1/06 229/128 |
| 6,311,142 B1 * | 10/2001 | Glassner | ...................... | G06T 19/00 446/388 |
| 6,643,962 B1 * | 11/2003 | Panec | ...................... | G09F 1/08 40/124.09 |
| 6,725,588 B1 * | 4/2004 | Swoboda | ...................... | G09F 1/06 281/38 |
| 6,877,263 B2 * | 4/2005 | Clark | ...................... | B42D 15/045 206/308.1 |
| 6,966,135 B1 * | 11/2005 | McDonald | ...................... | G11B 33/0422 206/232 |
| D555,211 S * | 11/2007 | Knight | ...................... | D21/509 |
| 7,618,301 B2 * | 11/2009 | Knight | ...................... | A63H 33/42 446/478 |
| 7,753,753 B2 * | 7/2010 | Payne | ...................... | A63H 33/42 446/478 |
| 7,836,620 B2 * | 11/2010 | Cole | ...................... | A63H 33/38 40/124.09 |
| 8,336,238 B1 * | 12/2012 | Hines | ...................... | G09F 1/08 40/539 |
| 2003/0097773 A1 * | 5/2003 | Oh | ...................... | G09F 1/06 40/124.08 |
| 2003/0230012 A1 * | 12/2003 | Mouyal | ...................... | G09F 1/06 40/124.08 |
| 2004/0083631 A1 * | 5/2004 | Zakova | ...................... | G09F 1/06 40/124.16 |
| 2004/0222549 A1 * | 11/2004 | Sano | ...................... | B29C 64/165 264/128 |
| 2005/0132621 A1 * | 6/2005 | Bostick, II | ...................... | G09F 1/06 40/124.08 |
| 2012/0285861 A1 * | 11/2012 | Glass | ...................... | B42D 15/042 206/768 |
| 2013/0139420 A1 * | 6/2013 | Rubar | ...................... | G09F 1/06 40/124.08 |

OTHER PUBLICATIONS

Glassner, Andrew. "Interactive pop-up card design. 2." Computer Graphics and Applications, IEEE 22.2 (2002): 74-85.*

Marsan, Anne, et al. "An assessment of data requirements and data transfer formats for layered manufacturing." NIST, US department of Commerce (1998).*

Non-Final Office Action for U.S. Appl. No. 13/740,093 dated Sep. 16, 2016.

Final Office Action for U.S. Appl. No. 13/740,093 dated Feb. 25, 2016.

Non-Final Office Action for U.S. Appl. No. 13/740,093 dated Oct. 16, 2015.

Non-Final Office Action for U.S. Appl. No. 13/740,093 dated Apr. 9, 2015.

Glassner, "Interactive pop-up card design. 1", Computer Graphics and Applications, IEEE 22.1. 2002 pp. 79-86.

Glassner, "Interactive pop-up card design. 2", Computer Graphics and Applications, IEEE 22.2, 2002, pp. 74-85.

Jun, "Automatic Paper Pop-Up Design", School of Computing National University of Singapore, 2010.

Marsan, et al., "An assessment of data requirements and data transfer formats for layered manufacturing", NIST, US department of Commerce, 1998.

* cited by examiner

TECHNIQUES FOR CREATING POP-UP CARDS FROM 3D MODELS

CROSS-REFERENCE TO RELATED APPLICATIONS

This application claims priority to U.S. Provisional Patent Application Ser. No. 61/586,537, filed Jan. 13, 2012, entitled "Pop Up Cards," which is hereby incorporated herein by reference.

BACKGROUND OF THE INVENTION

Field of the Invention

Embodiments presented in this disclosure generally relate to computer aided design (CAD) and computer aided manufacturing (CAM). More specifically, embodiments presented herein provide a techniques for pop-up cards from three-dimensional (3D) models.

Description of the Related Art

Pop-up cards are cards that, once fully opened, include a 3D structure that protrudes outward from the card, giving the card a 'pop out' effect. The 3D structures on the pop-up card are constructed by cutting and scoring two-dimensional material. The design of the 3D structure allows from the structure to be collapsed when the pop-up card is fully closed.

Determining an optimal location for placing the structure on the pop-up card such that the structure collapses and expands easily is a tedious and error prone task that is highly dependent on the design of the 3D structure. Further, manually determining the design of the 3D structure that allows for the structure to be collapsed and expanded is a complicated task. Therefore, pop-up cards are usually extremely difficult to make.

As the foregoing illustrates, what is needed in the art is a more effective approach for designing pop-up cards.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

SUMMARY

Embodiments presented herein provide techniques for a computer-implemented method for generating a pop-up card based on a three-dimensional (3D) graphics model. The method includes the steps of receiving a 3D model to be placed on a plane surface having a fold line along which the plane surface folds, slicing the 3D graphics model along a slice axis to generate a plurality of slices, where the slice axis is substantially parallel to the folding line, identifying a first location on a first slice where a second slice is to attach to the first slice, and modifying the second slice to include a hinge portion that extends from a second location on the second slice to the first location on the first slice.

One advantage of the disclosed techniques is that, given a 3D model, the structure of a pop-up card that includes that 3D model is automatically determined. Pop-up cards can, thus, be designed and produced efficiently.

DETAILED DESCRIPTION

Figure 1:
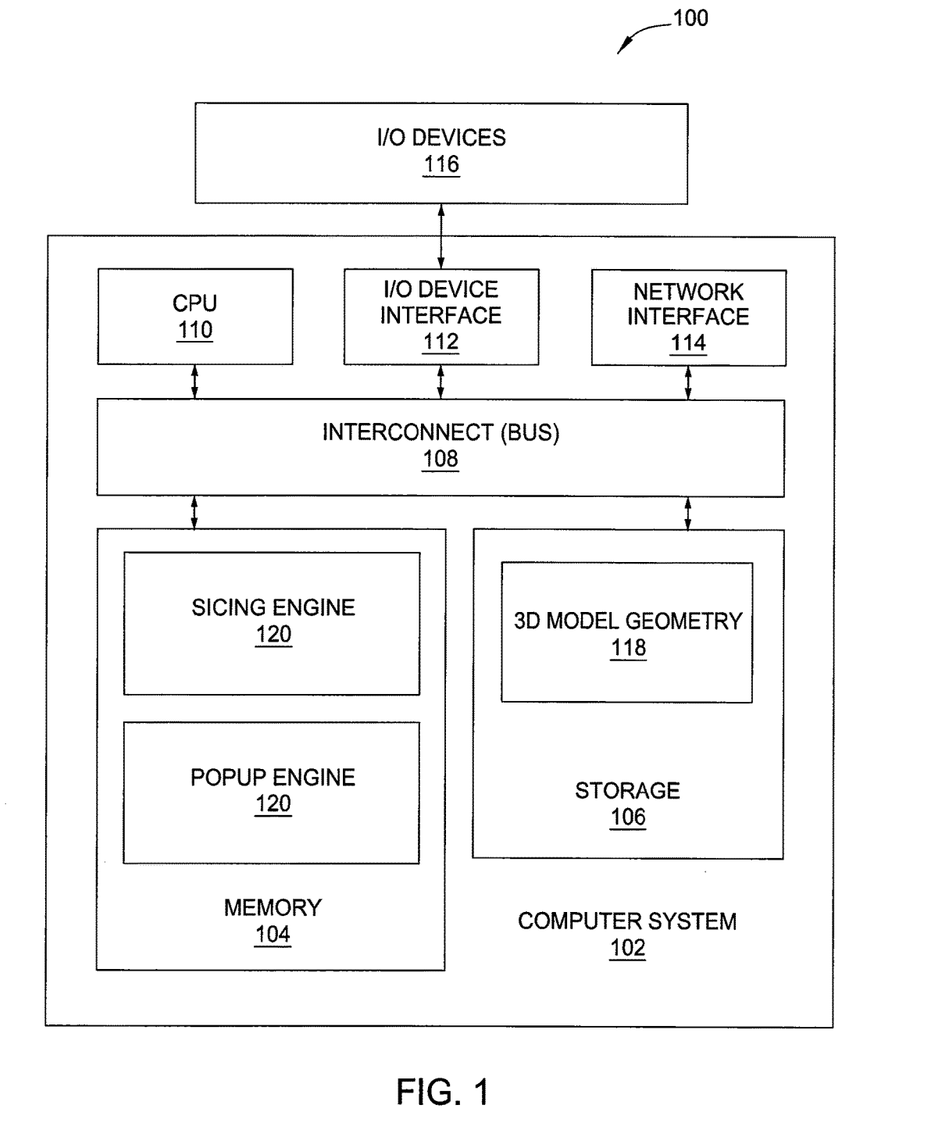
FIG. 1 illustrates an example system configured to create a pop-up card from a 3D model, according to one embodiment of the invention.

FIG. 1 illustrates an example system 100 configured to slice create a pop-up card from a 3D model, according to one embodiment of the invention. As shown, the computing system 100 includes, without limitation, a computer system 102 and input/output (I/O) devices 116. The computer system 102 includes a memory 102, storage 106, a central processing unit (CPU) 110, an I/O device interface 112, a network interface 114 and a bus 108. The I/O device interface 112 interfaces with the I/O devices 116 (e.g., keyboard, display and mouse devices).

CPU 110 retrieves and executes programming instructions stored in the memory 102. Similarly, CPU 110 stores and retrieves application data residing in the memory 102. The bus 108 transmits programming instructions and application data between the CPU 110, I/O devices interface 112, storage 106, network interface 114 and memory 102. CPU 110 is included to be representative of a single CPU, multiple CPUs, a single CPU having multiple processing cores, and the like. And the memory 102 is generally included to be representative of a random access memory. The storage 106 may be a disk drive storage device. Although shown as a single unit, the storage 106 may be a combination of fixed and/or removable storage devices, such as magnetic disc drives, solid state drives (SSD), removable memory cards, optical storage, network attached storage (NAS), or storage volumes mounted over a storage area-network (SAN), etc.

As shown, the memory 102 includes a slicing engine 120 and a popup engine 122. The slicing engine 120 slices 3D models based on one or more slice axes. Different slices of the sliced model are connected to reconstruct the 3D model. The pop-up engine 122 processes sliced 3D models and determines how such sliced 3D models are to attach to plane surfaces to create pop-up cards.

In operation, a user selects a plane surface and a pre-defined 3D model, such as the 3D model represented by the 3D geometry 118 stored in storage 106, for attaching to the surface. The surface includes a folding line indicating the line along which the surface is to fold to form a card. The selections of the plane surface and the pre-defined 3D model are transmitted to the pop-up engine 122. In one embodiment, the user orients the 3D model on the plane surface. In alternative embodiments, the pop-up engine determines an orientation of the 3D model on the plane surface based on the size of the 3D model and the location of the folding line.

The pop-up engine 122 then determines a slice axis (referred to herein as the "slice axis") along which the 3D model is to be sliced. In one embodiment, the user provides the axis along which the 3D model is to be sliced. In alternative embodiments, the pop-up engine 122 computes the axis along which the 3D model is to be sliced based on the orientation of the 3D model on the plane surface. Once the slice axis is determined, the pop-up engine 122 transmits the 3D model and the slice axis to the slicing engine 120.

In response, the slicing engine 120 slices the 3D model based on the set of slice axes to generate a set of slices associated with the 3D model. Each slice associated with the 3D model connects to at least one other slice to reconstruct the 3D model.

The slicing engine 120 transmits a representation of the sliced 3D model to the pop-up engine 122. The pop-up engine 122 then identifies locations on one or more of the set of slices associated with the 3D model where those slices are to attach to the plane surface selected by the user or other slices. The techniques implemented by the slicing engine 120 for determining attachment locations for a two-way sliced 3D model are described in more detail in FIGS. 2-6.

Figure 2:
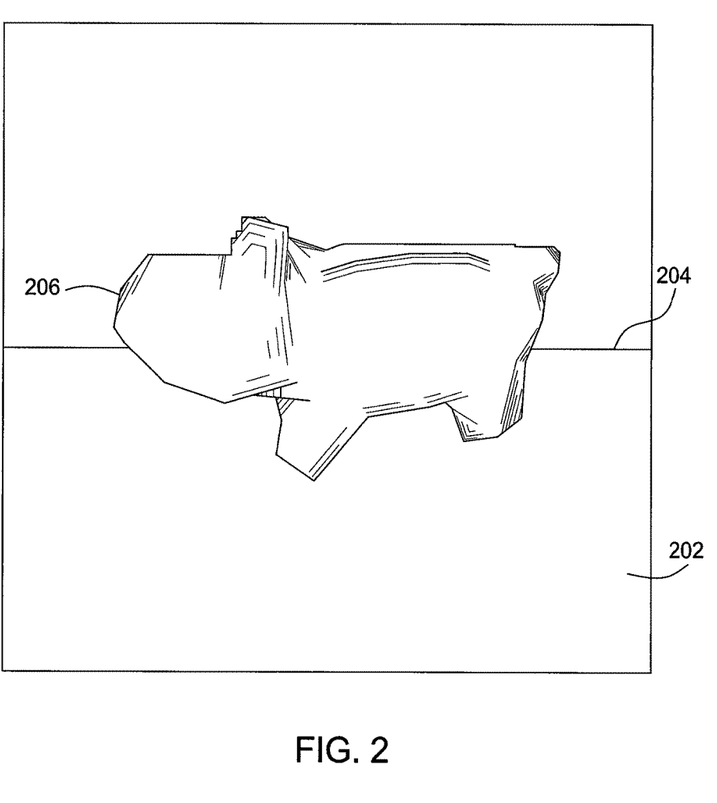
FIG. 2 illustrates a 3D model oriented on a plane of a pop-up card, according to one embodiment of the invention.

FIG. 2 illustrates a 3D model 206 oriented on a plane 202 of a pop-up card, according to one embodiment of the invention. As shown, the plane 202 includes a folding line 204 along which the plane is to be folded. The 3D model 206 is oriented on the plane 202 such that the 3D model 206 intersects the folding line 204. As discussed above, in one embodiment, the user orients the 3D model on the plane surface. In alternative embodiments, the pop-up engine determines an orientation of the 3D model on the plane surface based on the size of the 3D model and the location of the folding line 204. The pop-up engine 122 then determines the slice axis as the axis parallel of the folding line 204. The pop-up engine 122 transmits the 3D model 206, the slice axis 208 and the slice axis 210 to the slicing engine 120 for slicing, as discussed above.

Figure 3:
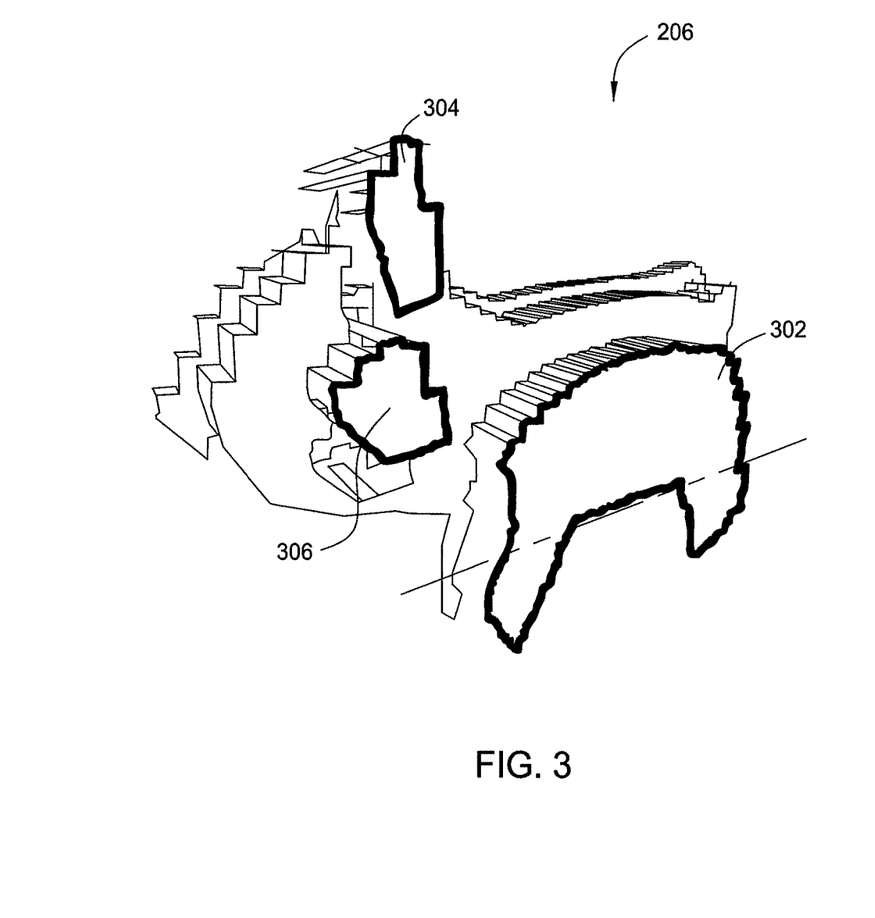
FIG. 3 illustrates the 3D model sliced along a slice axis, according to one embodiment of the invention.

FIG. 3 illustrates the 3D model 206 sliced along a slice axis, according to one embodiment of the invention. As discussed above, the slicing engine 120 slices the 3D model 206 along the slice axis determined by the pop-up engine 122. The slices that are generated, such as slice 304 and slice 302, may be reconstructed to form the 3D model 206, as shown. The slicing engine 120 transmits the sliced 3D model 206 to the pop-up engine 122 for further processing.

Figure 4:
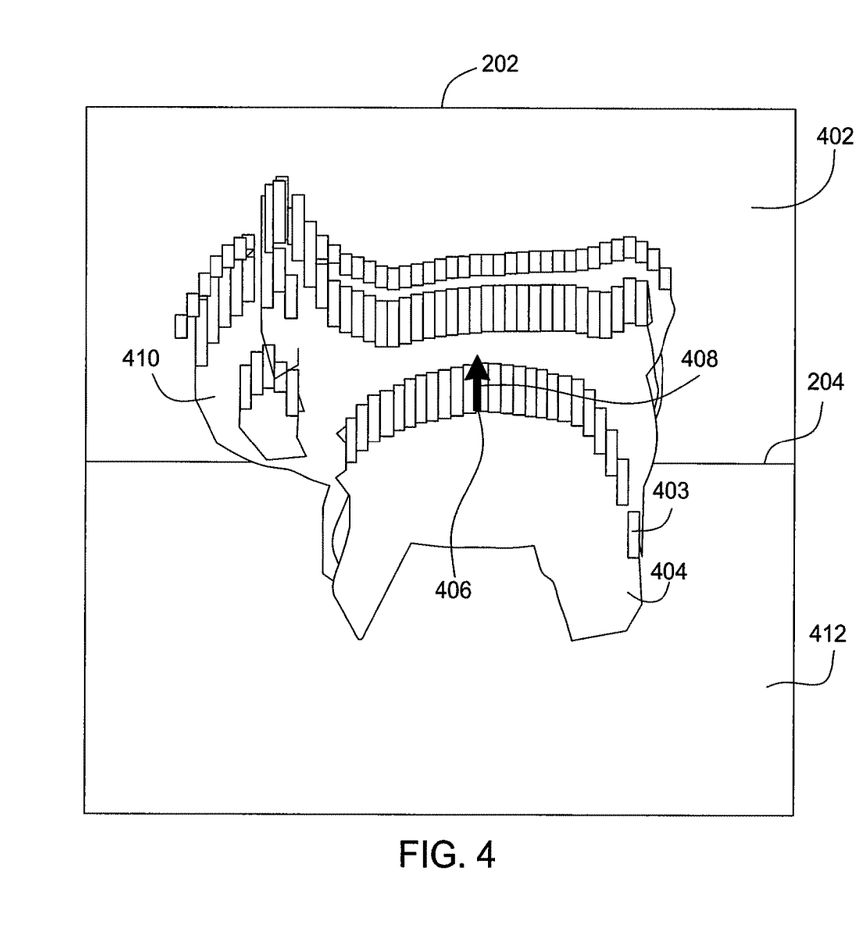
FIG. 4 illustrates the sliced 3D model attached to the plane of FIG. 2 via hinges, according to one embodiment of the invention.

FIG. 4 illustrates the sliced 3D model 206 attached to the plane 202 of FIG. 2 via hinges, according to one embodiment of the invention. In operation, the pop-up engine 122 receives the sliced 3D model 206 from the slicing engine 120 and places the sliced 3D model 206 onto the plane 202. In one embodiment, the pop-up engine 122 places the sliced 3D model 206 at such an orientation that the slices of the 3D model are perpendicular to the folding line 204.

Once the sliced 3D model 206 is properly oriented, the pop-up engine 122 then identifies attachment locations for each slice where the slice attaches to the plane 202 and/or one or more neighboring slices. More specifically, the pop-up engine 122 traverses the boundary of each slice and, at pre-determined intervals along the boundary, projects a ray that is perpendicular to the folding line toward the upper portion 402 of the plane 202. At a given location along the boundary of a particular slice, if the ray intersects with a neighboring slice, then the particular slice attaches to the neighboring slice at that location. If, however, the ray does not intersect a neighboring slice, then the particular slice attaches to the upper portion 402 of the plane 202 at that location. The pop-up engine 122 then modifies the particular slice to include a hinge portion, such as hinge portion 403, that connects the slice to either a neighboring slice or the upper portion 402 at that location.

As an example, when determining attachment locations for slice 404, the pop-up engine 122 traverses the boundary of the slice 404. At location 406 along the boundary, the pop-up engine 122 projects the ray 408 toward the upper portion 402 of the plane 202. Since the ray intersects neighboring slice 410, the pop-up engine 122 determines that the slice 404 attaches to the slice 410 at the location 406. The pop-up engine 122 then modifies the slice 404 to include a hinge portion that connects the slice 404 to the slice 410 at the location 406.

In one embodiment, the pop-up engine 122 also modifies each slice to include a tab portion via which the slice attaches to the lower portion 412 of the plane 202. In such an embodiment, the pop-up engine 122 first identifies a location on the boundary of the slice where the slice is to attach to the lower portion 412. The pop-up engine 122 then extends the slice to include a tab portion. Finally, the pop-up engine 122 identifies a location on the lower portion 412 where the tab portion slides into the lower portion 412.

Figure 5A:
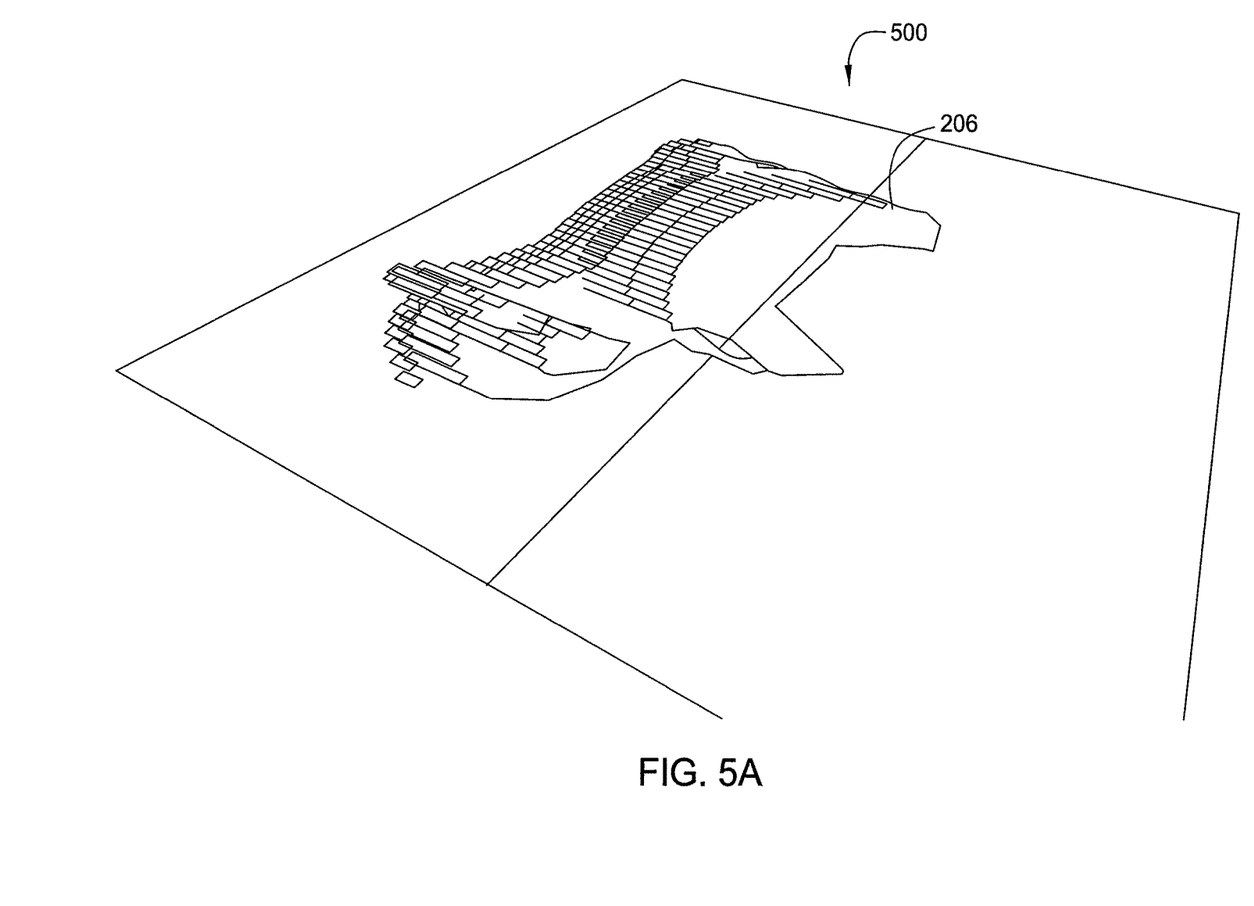
FIGS. 5A-5C illustrate a physical pop-up card with the attached 3D model being folded, according to one embodiment of the invention.
Figure 5B:
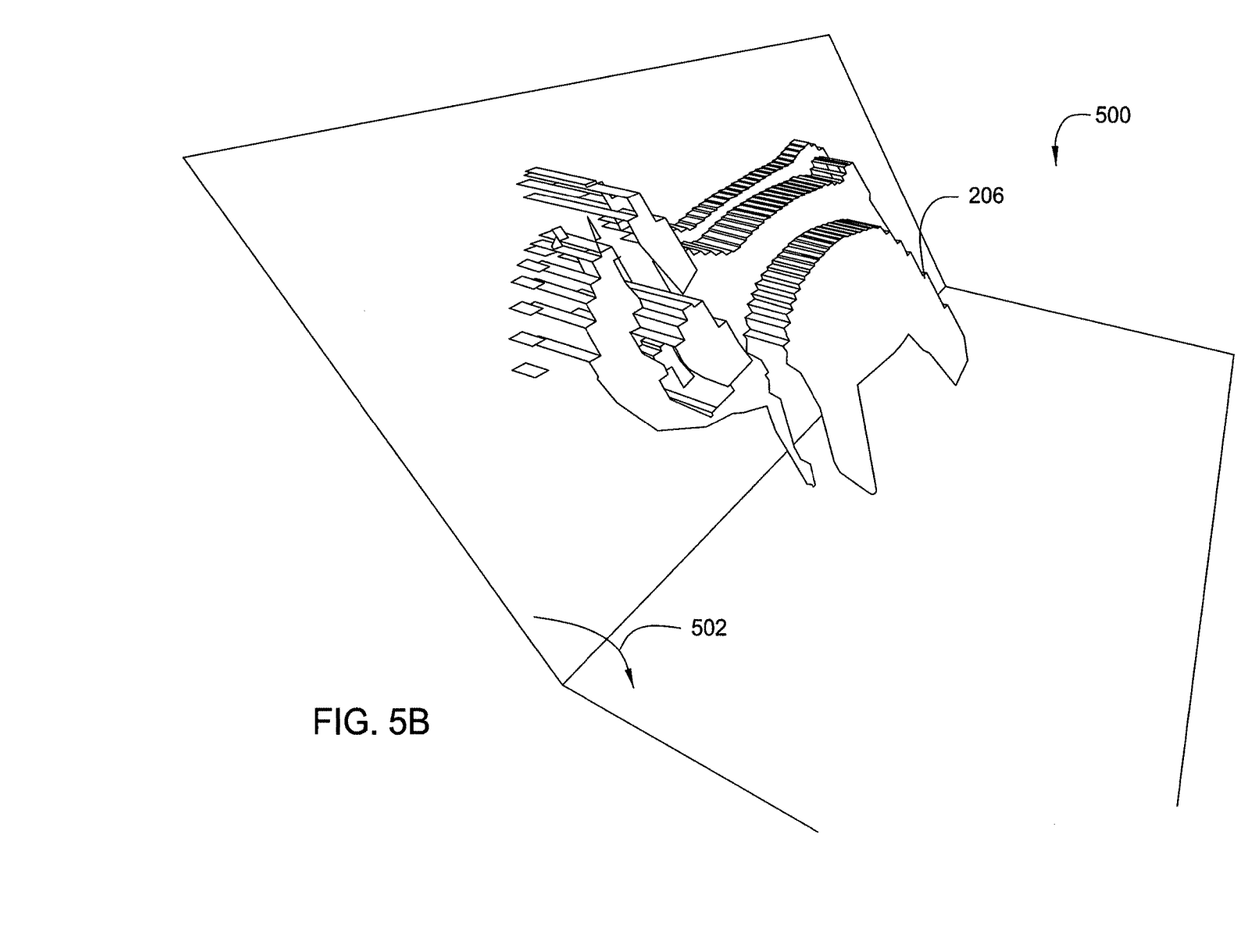
Figure 5C:
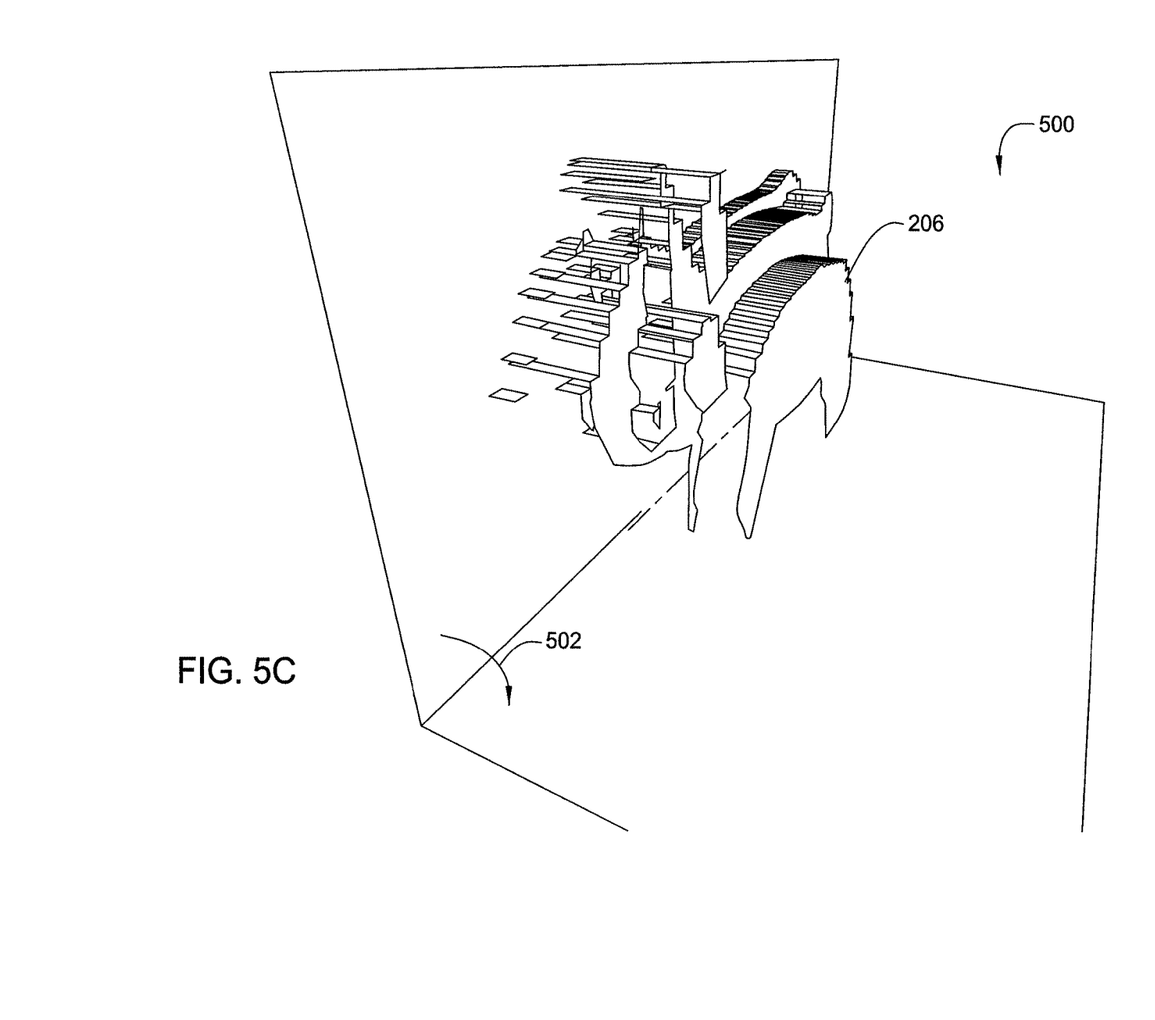

FIGS. 5A-5C illustrate a physical pop-up card 500 with the attached 3D model 206 being folded, according to one embodiment of the invention. As shown in FIG. 5A, the pop-up card 500 is in a completely open state such that the 3D model 206 lays flat on the surface of the pop-up card 500. In FIG. 5B, the pop-up card 500, via the folding motion 502, transitions to a semi-folded state such that the 3D model 206 is slightly expanded within the pop-up card 500. Finally, in FIG. 5C, the pop-up card 500, via the folding motion 502 transitions to a substantially expanded state such that the 3D model 206 is fully erect within the pop-up card 500.

Figure 6:
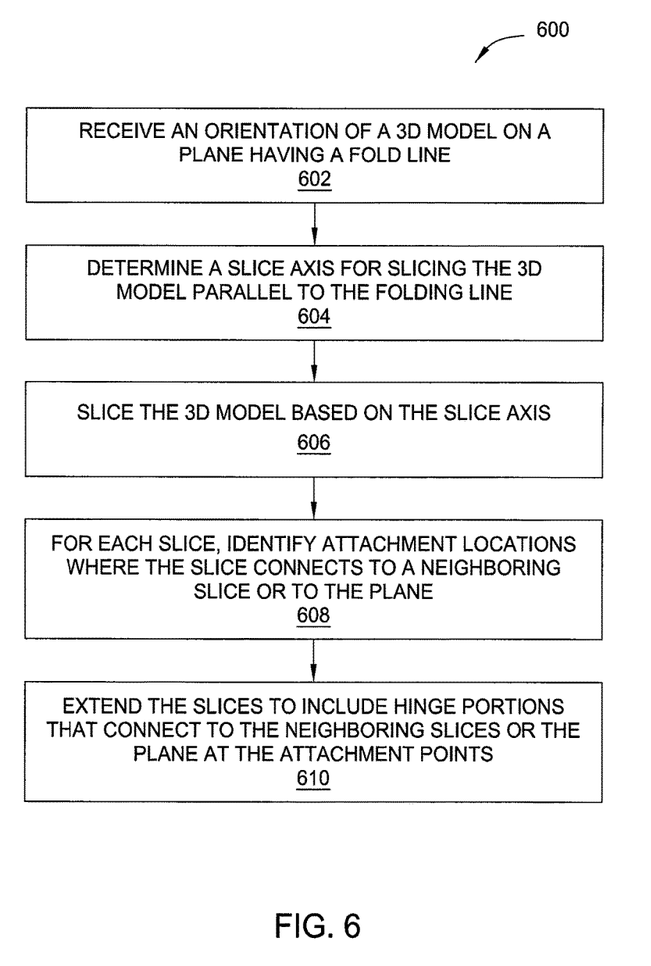
FIG. 6 is a flow diagram of method steps for generating a pop-up card based on a 3D model selected by a user, according to one embodiment of the invention.

FIG. 6 is a flow diagram of method steps for generating a pop-up card based on a 3D model selected by a user, according to one embodiment of the invention. Although the method steps are described in conjunction with the system for FIG. 1, persons skilled in the art will understand that any system configured to perform the method steps, in any order, is within the scope of the invention.

The method 600 begins at step 602, where the pop-up engine 122 determines an orientation of a 3D model to be attached to a plane surface having a folding line. In one embodiment, the pop-up engine 122 determines the orientation based on a user-selected orientation of the 3D model on the plane surface. In alternative embodiments, the pop-up engine determines the orientation of the 3D model on the plane surface based on the size of the 3D model and the location of the folding line.

At step 604, the pop-up engine 122 then determines a slice axis along which the 3D model is to be sliced. The slice axis is parallel to the folding line of the plane surface. At step 606, the slicing engine 120 slices the 3D model based on the slice axis to generate a set of slices associated with the 3D model. Each slice associated with the 3D model connects to at least one other slice and or the plane surface to reconstruct the 3D model.

At step 608, the pop-up engine 122 identifies attachment locations for each slice where the slice attaches to the plane 202 and/or one or more neighboring slices. In operation, the pop-up engine 122 traverses the boundary of each slice and, at pre-determined intervals along the boundary, projects a ray that is perpendicular to the folding line toward the upper portion of the plane 202. At a given location along the boundary of a particular slice, if the ray intersects with a neighboring slice, then the slice attaches to the neighboring slice at that location. If, however, the ray does not intersect a neighboring slice, then the slice attaches to the upper portion 402 of the plane 202 at that location.

At step 610, the pop-up engine 122 modifies each slice to include a hinge portion at each attachment location that connects the slice to either a neighboring slice or the upper portion as determined in step 608.

In sum, a pop-up engine processes a sliced 3D model to identify locations where each slice of the 3D model is to attach to a plane surface of a pop-up card or to other slices of the 3D model. The pop-up engine 122 traverses the boundary of each slice and, at pre-determined intervals along the boundary, projects a ray that is perpendicular to the folding line toward the upper portion of the plane. If the ray intersects a neighboring slice, then the slice attaches to the neighboring slice at that location. If, however, the ray does not intersect a neighboring slice, then the slice attaches to the upper portion of the pop-up card at that location. The pop-up engine then modifies the slice to include a hinge portion that connects the slice to either a neighboring slice or the upper portion at that location.

One advantage of the disclosed techniques is that, given a 3D model, the structure of a pop-up card that includes that 3D model is automatically determined. Pop-up cards can, thus, be designed and produced efficiently.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A computer-implemented method for generating a physical pop-up card based on a three-dimensional (3D) graphics model, the method comprising:
receiving, from a memory, a 3D graphics model to be placed on a plane surface having a fold line along which the plane surface folds;
slicing, via a processor, the 3D graphics model along a slice axis to generate a plurality of slices, wherein the slice axis is substantially parallel to the folding line;
identifying a first plurality of locations on a first slice included in the plurality of slices where a second slice included in the plurality of slices is to attach to the first slice; and
modifying the second slice to include a plurality of hinge portions that extend, in a direction substantially perpendicular to the slice axis, from a second plurality of locations on the second slice to the first plurality of locations on the first slice, wherein the second plurality of locations comprise locations on a boundary of the second slice,
wherein the plurality of slices and the plurality of hinge portions enable the physical pop-up card to transition to an expanded state in which the 3D graphics model is upright within the physical pop-up card.

2. The method of claim 1, wherein identifying the first plurality of locations comprises projecting at least one ray from a location included in second plurality of locations on the second slice and determining that the ray intersects the first slice at a location included in the first plurality of locations.

3. The method of claim 1, further comprising identifying a second location on the first slice where the first slice is to attach to the plane surface.

4. The method of claim 3, wherein identifying the second location comprises projecting a ray from the second location and determining that the ray intersects with an upper portion of the plane surface and does not intersect with any slice included in the plurality of slices.

5. The method of claim 1, further comprising identifying a second location on the first slice where the first slice is to attach to a lower portion of the plane surface.

6. The method of claim 5, further comprising extending the first slice to include a tab portion positioned at the second location.

7. The method of claim 6, further comprising identifying a surface location on the lower portion where the tab portion slides into the plane surface.

8. The method of claim 1, further comprising determining an orientation of the 3D graphics model on the plane surface.

9. One or more non-transitory computer-readable media including instructions that, when executed by a processing unit, cause the processing unit to generate a physical pop-up card based on a three-dimensional (3D) graphics model, by performing the steps of:
receiving, from a memory, a 3D graphics model to be placed on a plane surface having a fold line along which the plane surface folds;
slicing, via a processor, the 3D graphics model along a slice axis to generate a plurality of slices, wherein the slice axis is substantially parallel to the folding line;
identifying a first plurality of locations on a first slice included in the plurality of slices where a second slice included in the plurality of slices is to attach to the first slice; and
modifying the second slice to include a plurality of hinge portions that extend, in a direction substantially perpendicular to the slice axis, from a second plurality of locations on the second slice to the first plurality of locations on the first slice, wherein the second plurality of locations comprise locations on a boundary of the second slice,
wherein the plurality of slices and the plurality of hinge portions enable the physical pop-up card to transition to an expanded state in which the 3D graphics model is upright within the physical pop-up card.

10. The one or more non-transitory computer-readable media of claim 9, wherein identifying the first plurality of locations comprises projecting at least one ray from a location included in second plurality of locations on the second slice and determining that the ray intersects the first slice at a location included in the first plurality of locations.

11. The one or more non-transitory computer-readable media of claim 9, further comprising identifying a second location on the first slice where the first slice is to attach to the plane surface.

12. The one or more non-transitory computer-readable media of claim 11, wherein identifying the second location comprises projecting a ray from the second location and determining that the ray intersects with an upper portion of the plane surface and does not intersect with any slice included in the plurality of slices.

13. The one or more non-transitory computer-readable media of claim 9, further comprising identifying a second location on the first slice where the first slice is to attach to a lower portion of the plane surface.

14. The one or more non-transitory computer-readable media of claim 13, further comprising extending the first slice to include a tab portion positioned at the second location.

15. The one or more non-transitory computer-readable media of claim 14, further comprising identifying a surface location on the lower portion where the tab portion slides into the plane surface.

16. The one or more non-transitory computer-readable media of claim 9, further comprising determining an orientation of the 3D graphics model on the plane surface.

17. A computing device, comprising:
   a processor configured to generate a physical pop-up card based on a three-dimensional (3D) graphics model by:
      receiving a 3D graphics model to be placed on a plane surface having a fold line along which the plane surface folds;
      slicing the 3D graphics model along a slice axis to generate a plurality of slices, wherein the slice axis is substantially parallel to the folding line;
      identifying a first plurality of locations on a first slice included in the plurality of slices where a second slice included in the plurality of slices is to attach to the first slice; and
      modifying the second slice to include a plurality of hinge portions that extend, in a direction substantially perpendicular to the slice axis, from a second plurality of locations on the second slice to the first plurality of locations on the first slice, wherein the second plurality of locations comprise locations on a boundary of the second slice,
   wherein the plurality of slices and the plurality of hinge portions enable the physical pop-up card to transition to an expanded state in which the 3D graphics model is upright within the physical pop-up card.

18. The computing device of claim 17, further comprising a memory that includes instructions that, when executed by the processor, cause the processor to perform the steps of receiving, slicing, identifying, and modifying.

19. The one or more non-transitory computer-readable media of claim 9, wherein each of the first slice and the second slice is sliced along a slice plane, and the slice plane is substantially parallel to the folding line.

20. One or more non-transitory computer-readable media including instructions that, when executed by a processing unit, cause the processing unit to generate a pop-up card based on a three-dimensional (3D) graphics model, by performing the steps of:
   receiving, from a memory, a 3D graphics model to be placed on a plane surface having a fold line along which the plane surface folds;
   slicing, via a processor, the 3D graphics model along a slice axis to generate a plurality of slices, wherein the slice axis is substantially parallel to the folding line;
   identifying a first plurality of locations on a first slice included in the plurality of slices where a second slice included in the plurality of slices is to attach to the first slice;
   modifying the second slice to include a plurality of hinge portions that extend, in a direction substantially perpendicular to the slice axis, from a second plurality of locations on the second slice to the first plurality of locations on the first slice; and
   storing the plurality of slices and the plurality of hinge portions in the memory,
   wherein the plane surface comprises a first portion on a first side of the fold line and a second portion on a second side of the fold line, and, when the plane surface is folded along the fold line so that the first portion is substantially perpendicular to the second portion:
      the plurality of slices are substantially parallel to the first portion and substantially perpendicular to the second portion, and
      each hinge portion included in the plurality of hinge portions is substantially parallel to the second portion of the plane surface.

21. The one or more non-transitory computer-readable media of claim 9, wherein the first plurality of locations comprise locations on a boundary of the first slice.

22. The one or more non-transitory computer-readable media of claim 9, wherein the boundary of the second slice is an upper boundary of the second slice, and the first plurality of locations comprise locations on a lower boundary of the first slice.

23. The one or more non-transitory computer-readable media of claim 9, wherein the plurality of slices and the plurality of hinge portions enable the physical pop-up card to transition from an open state in which the 3D graphics model lays substantially flat on a surface of the physical pop-up card to the expanded state in which the 3D graphics model is upright within the physical pop-up card.

* * * * *

UNITED STATES PATENT AND TRADEMARK OFFICE
CERTIFICATE OF CORRECTION

PATENT NO. : 10,453,255 B2  
APPLICATION NO. : 13/740097  
DATED : October 22, 2019  
INVENTOR(S) : Jonathan Bachrach and Saul Griffith Page 1 of 1

It is certified that error appears in the above-identified patent and that said Letters Patent is hereby corrected as shown below:

On the Title Page

At Column 1, Line 1, (72) Inventors:  
Please delete "Johnathan Bachrach" and insert --Jonathan Bachrach--.

Signed and Sealed this  
Thirtieth Day of June, 2020

Andrei Iancu  
*Director of the United States Patent and Trademark Office*